United States Patent Office 3,403,004
Patented Sept. 24, 1968

3,403,004
MEANS AND METHOD FOR THE DETECTION OF URANIUM
Ervin Jungreis and Lina Ben-Dor, Jerusalem, Israel, assignors to Yissum Research Development Company, Jerusalem, Israel, a company of Israel
No Drawing. Filed Nov. 20, 1964, Ser. No. 412,830
Claims priority, application Israel, Nov. 29, 1963, 20,351
6 Claims. (Cl. 23—230)

ABSTRACT OF THE DISCLOSURE

Detection of uranium in various materials, such as ores, earth, etc. The uranium is detected by a reagent which is prepared by reacting p-dimethylaminoaniline hydrochloride and salicylaldehyde which is then reacted with ammonia, the product being yellow. Uranyl ions added to the yellow product give a color change from yellow to red.

---

It is an object of the present invention to provide a novel reagent for the detection of uranium. It is a further object of the present invention to provide novel means for the detection of uranium. It is yet a further object of the present invention to provide a novel method for the detection and estimation of uranium in various materials. Other and further objects of the invention will become apparent hereinafter.

The novel reagent according to the present invention is suited for the detection of uranium in various materials, such as ores, earth, chemicals and the like. It provides for a specific reaction which can be carried out in the presence of other constituents of the material which is examined. According to the present invention there is also provided a novel means for the detection and estimation of uranium, said means comprising a suitable, preferably fibrous, carrier impregnated with the novel reagent. A preferred carrier comprises filter paper imbued with the new reagent, and this provides for the rapid and convenient detection of uranium.

The novel reagent according to the present invention is prepared by reaction p-dimethylaminoanilins hydrochloride with salicylaldehyde, and the red reaction product is reacted with ammonia to give

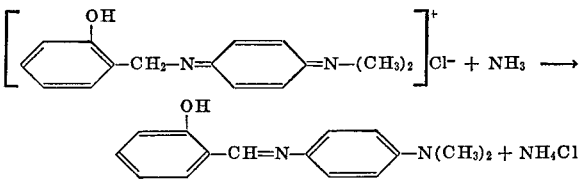

which is of yellow color. When uranyl ions are added to this yellow product which contains ammonium chloride, complex[UO₂Cl₄]⁻² ions are formed according to

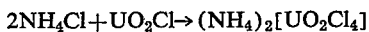

This complex, a voluminous anion, gives a color change from yellow to red upon addition of the uranyl ions.

In the following the invention will be described by way of example only, and it is clear that the invention is not restricted to the specific illustrative embodiments given hereinafter.

Example.—Preparation of reagent paper

A concentrated alcoholic solution of p-dimethylaminoaniline hydrochloride is mixed with a concentrated alcoholic solution of salicylaldehyde and immersed for a few minutes in a boiling-water bath. The red solution is poured on filter paper and this is incompletely dried with cold air. The red paper is placed on top of a beaker containing concentrated ammonia. After a few minutes the color changes to yellow and at this stage the drying is completed. The impregnated paper can be stored for at least a year without deterioration.

Detection of uranium

The impregnated reagent paper is wetted with a drop of the solution to be tested, containing the uranium in the form of hexavalent uranyl ions. The pH of the test solution is to be advantageously in the range between 2 and 3. When uranyl ions are present, there appears a red spot, and its intensity is proportional to the quantity of the uranium present. The lower limit of uranium detectable by this procedure is about 1 microgram.

It is possible to spot reagent paper with standard solutions varying concentrations of $U^{IV}$-ions. For example, there may be prepared reagent paper strips spotted with concentrations of 1 mcg., 5 mcg., 10 mcg., 50 mcg., 100 mcg., 250 mcg. and these can be stored for prolonged periods. The spot obtained with an unknown solution containing $U^{IV}$-ions is compared with these spotted strips and the approximate concentration can thus be deduced. Preferably the concentration of the solutions to be tested ought not to be higher than about 1% respective of $U^{vi}$-ions.

Amongst many cations tested, only iron interferes by giving a violet color reaction with salicylaldehyde. Due to differences of the rate of capillary diffusion a central blue-violet and a larger red ring are obtained when both uranium and iron are present.

This procedure may be used for the colorimetric determination of uranium by suitable adaptations of the method.

We claim:

1. A method for the preparation of means for the detection of uranium which comprises preparing an organic-solvent solution of p-dimethylaminoaniline hydrochloride, preparing an organic-solvent solution of salicylaldehyde, admixing the solutions and heating same, applying the red reaction product to a carrier, and subjecting the carrier to ammonia until the color changes to yellow.

2. Method for the detection and estimation of uranyl ions which comprises applying a test solution to means prepared according to claim 1.

3. Method for the detection and estimation of uranyl ions which comprises applying a test solution to filter paper impregnated with a reagent comprising the red reaction product obtained by heating of p-dimethylaminoaniline hydrochloride and salicylaldehyde acted upon with ammonia until said red color has been converted to yellow.

4. Method for the detection and estimation of uranyl ions which comprises applying a test solution to fibrous carrier means impregnated with a reagent comprising the red reaction product obtained by heating of p-dimethylaminoaniline hydrochloride and salicylaldehyde acted upon with ammonia until said red color has been converted to yellow.

5. Means for the detection of uranium comprising a suitable carrier impregnated with a reagent comprising the red reaction product obtained by heating of p-dimethylaminoaniline hydrochloride and salicylaldehyde acted upon with ammonia until said red color has been converted to yellow.

6. Means as set forth in claim 5, whereas the carrier is filter paper.

References Cited

UNITED STATES PATENTS 3,099,537 7/1963 Mason et al. _____ 23—230
3,252,761 5/1966 Jungreis _____ 23—230

OTHER REFERENCES

Rodden, E. J., ed., Analytical Chemistry of the Manhattan Project, 1950, p. 10.

Moore, F. J. et al.: Journal of the American Chemical Society, vol. XXX, 1908, pp. 394–404.

Beilsteins Handbuch der Orgganischen Chemi, Band XIII, 1943, p. 92.

MORRIS O. WOLK, *Primary Examiner.*

E. A. KATZ, *Assistant Examiner.*